United States Patent [19]

Matsumura et al.

[11] 4,434,657
[45] Mar. 6, 1984

[54] LIQUID QUANTITY MEASURING APPARATUS

[75] Inventors: Hiroshi Matsumura, Kamakura; Yasuto Ohta, Yokohama; Tetsuo Nozaki, Zushi; Makoto Shimizu, Chigasaki; Shigeru Sugizaki, Hiratsuka, all of Japan

[73] Assignee: Tokyo Tatsuno Co., Ltd., Tokyo, Japan

[21] Appl. No.: 318,509

[22] Filed: Nov. 5, 1981

[30] Foreign Application Priority Data

Sep. 25, 1981 [JP] Japan ............................ 56-150565

[51] Int. Cl.³ .............................................. G01F 23/26
[52] U.S. Cl. .................................................. 73/304 C
[58] Field of Search ...................... 318/642; 73/304 C

[56] References Cited

U.S. PATENT DOCUMENTS

| | | | |
|---|---|---|---|
| 3,283,577 | 11/1966 | Schuck | 73/304 C |
| 4,163,391 | 8/1979 | Bezard et al. | 73/304 R |
| 4,204,427 | 5/1980 | Gothe et al. | 73/304 C |
| 4,296,472 | 10/1981 | Sarkis | 73/304 C |
| 4,296,630 | 10/1981 | Jung et al. | 73/304 C |
| 4,349,882 | 9/1982 | Asmundsson et al. | 73/304 C |

*Primary Examiner*—Charles E. Frankfort
*Assistant Examiner*—David R. Schuster
*Attorney, Agent, or Firm*—Jordan and Hamburg

[57] ABSTRACT

An apparatus for measuring the quantity of a liquid such as a fuel in a tank, which comprises liquid level measuring electrodes, comparing electrodes dipped always in the liquid to detect the capacitance inherent to the liquid, an LC oscillator for converting each capacitive value measured by the electrodes into a corresponding frequency signal, reference electrodes constituting a level feeder together with the oscillator to compensate for capacitive variation of the latter, and a microcomputer for calculating a liquid quantity in the tank based on the frequency signals and for displaying the calculated quantity.

13 Claims, 4 Drawing Figures

LIQUID QUANTITY MEASURING APPARATUS

BACKGROUND OF THE INVENTION

1. Field of the Invention

The present invention relates to an apparatus for measuring the quantity of a liquid such as a fuel in a tank and more particularly to such apparatus of the type for capacitively detecting a liquid level in the tank to indicate the liquid quantity.

2. Description of the Prior Art

A capacitor type liquid quantity measuring apparatus per se has been disclosed, for instance by U.S. Pat. No. 3,208,280 issued on Sept. 28, 1965. Such an apparatus utilizes principle that, if there is a dielectric substance such as air, fuel, water or the like between a pair of opposing positive and negative electrode plates, the electrode plates form a capacitor together with a medium of the substance; and thus when the electrode plates are arranged vertically in a vessel such as a tank, a surface area of the electrode plates dipped in the fuel is varied substantially depending on fuel level in the tank so as to show a change of capacitance, which corresponds to the fuel level. In this case, it is of course necessary to arrange another pair of electrode plates always dipped fully in the fuel, which measures a dielectric constant variation due to the temperature of the fuel to compensate the relationship between the capacity measured by the first pair of the electrode plates and the level of the fuel in the tank. In said U.S. patent, the capacitive information from said both pairs of electrode plates are fed through an amplifier to a motor which operates a wiper of potentiometer and an indicator to convert the capacitive informations into the information of fuel level and to indicate the same on the indicator. However, such known system is not suitable for measuring the quantity of fuel in each of plural tanks to centrally conduct the fuel, since as aforesaid, the capacity is quite sensitive to the change of temperature and thus if the capacitive information is fed in this form over a relatively long distance, the value changes to such an extent that any correction is impossible.

The above U.S. patent is directed mainly to the fuel gauging apparatus for airplanes and gives neither disclosure nor suggestion for detecting undesired water which possibly accumulates at bottom of the tank. This detection is very important matter in order to remove water from fuel accommodated in underground tanks, such as in fuel dispensing stations. Namely, such a tank has a ventilation opening communicating with an inside of the tank from a safety view-point and thus rainwater may enter in the tank through the opening to form a water layer under the fuel layer and if a flood is caused, a large amount of water may also enter in the tank through the opening. Even if such exceptional occasions are excluded, further, the fuel such as gasoline for vehicles contains inevitably some quantity of water and thus the accumulation of water can not be avoided due to a separation thereof from the fuel during the storing of the fuel. Further, the temperature difference between the inside of tank and atmosphere causes a condensation of moisture in air as water drops at inner surface of a pipe communicating with said ventilation opening, said water drops flowing down through the surface into the fuel tank to increase water level therein.

Even if the water layer has already been formed in the fuel tank due to at least one of said or other causes, each of known methods for measuring the quantity of fuel based on a level of fuel in the tank indicates the remaining fuel quantity under an assumption that water is not present in the tank. It is, therefore, necessary to set the lower level for dispensing the fuel at a relatively high point, in order to avoid a possible supply of water-containing fuel to vehicles and the like. This means that the dispensable fuel amount in the tank decreases and that a careful operation is required on removal of the water by suction, since the amount of water accumulated in the tank can not be confirmed.

SUMMARY OF THE INVENTION

A basic object of the present invention is to provide an apparatus for measuring the quantity of a liquid such as a fuel in a tank, based on its level and for detecting an accumulation of water in the tank, when a layer of water reaches a predetermined level, so as to make it possible to remove undesired water from the fuel in the tank.

A specific object of the present invention is to provide an apparatus for measuring the quantity of a liquid such as a fuel in each of plural tanks and for detecting water in each tank, whereby various information on the liquids in each tank can centrally be conducted at a suitable place in an office cabin.

Another specific object of the present invention is to provide an apparatus for measuring the quantity of a liquid such as fuel in at least one tank, wherein a warning information is given when a level of the liquid in the tank reaches each of predetermined upper and lower limit one, to prevent an excessive supply of fuel in the tank and to show the necessity of replenishment of fuel in the tank.

According to the present invention, the above and other objects which can be apparent by fully understanding the invention can be attained by an apparatus for measuring the quantity of a liquid in at least one tank, which comprises means for detecting a liquid level in the tank, having positive and negative electrodes arranged to allow a flow-in and out of the liquid therebetween, means arranged below said liquid level detecting means and dipped always in the liquid to measure a dielectric constant of the liquid, a reference means adapted that a variation is less in its capacitance, even if an atmosphere thereof changes, an LC oscillator means converting each value of capacities measured by said liquid level detecting means, liquid dielectric constant measuring means and reference means into a frequency signal, and a control box with an indicator means, to calculate the quantity of the liquid in the tank based on the frequency information and to indicate the same on the indicator means.

It is preferable that said liquid level detecting means, liquid dielectric constant measuring means and reference means have substantially the same capacity, so as to make their responsive characteristics similar.

The apparatus may further comprise means arranged near bottom of the tank to detect a second liquid such as water, which may be formed as a part of the dielectric constant measuring means for the first liquid. The liquid dielectric constant measuring means may be made as a plurality of hollow cylindrical members arranged in concentric manner, which constitute alternatively positive and negative electrodes, whereby the required surface area for each polar electrode can be obtained without so increasing height thereof.

It is preferable that said reference means has a capacitor. Said reference means and LC oscillator means constitute a level feeding means together with a pair of relay means, said level feeding means being arranged near the liquid level detecting means to reduce the influence of ambient temperature change to capacitive information from the liquid level detecting means, liquid dielectric constant measuring means and reference means. The level feeding means is embedded in an insulation material body to form a unitary member, so as to make easy its replacement.

It is preferable that each of said liquid level detecting means, liquid dielectric constant measuring means and reference means has a cylindrical configuration with substantially the same diameter and being detachably connected through a conductive support, to simplify separation and replacement thereof.

THE BRIEF DESCRIPTION OF THE DRAWINGS

The drawings illustrate an embodiment of an apparatus according to the present invention, wherein FIG. 1 is a diagrammatic illustration of the apparatus applied for measuring a liquid such as a fuel in underground tanks, a detecting part and another part thereof being shown respectively vertically and perspectively;

DESCRIPTION OF THE PREFERRED EMBODIMENT

Figure 1:
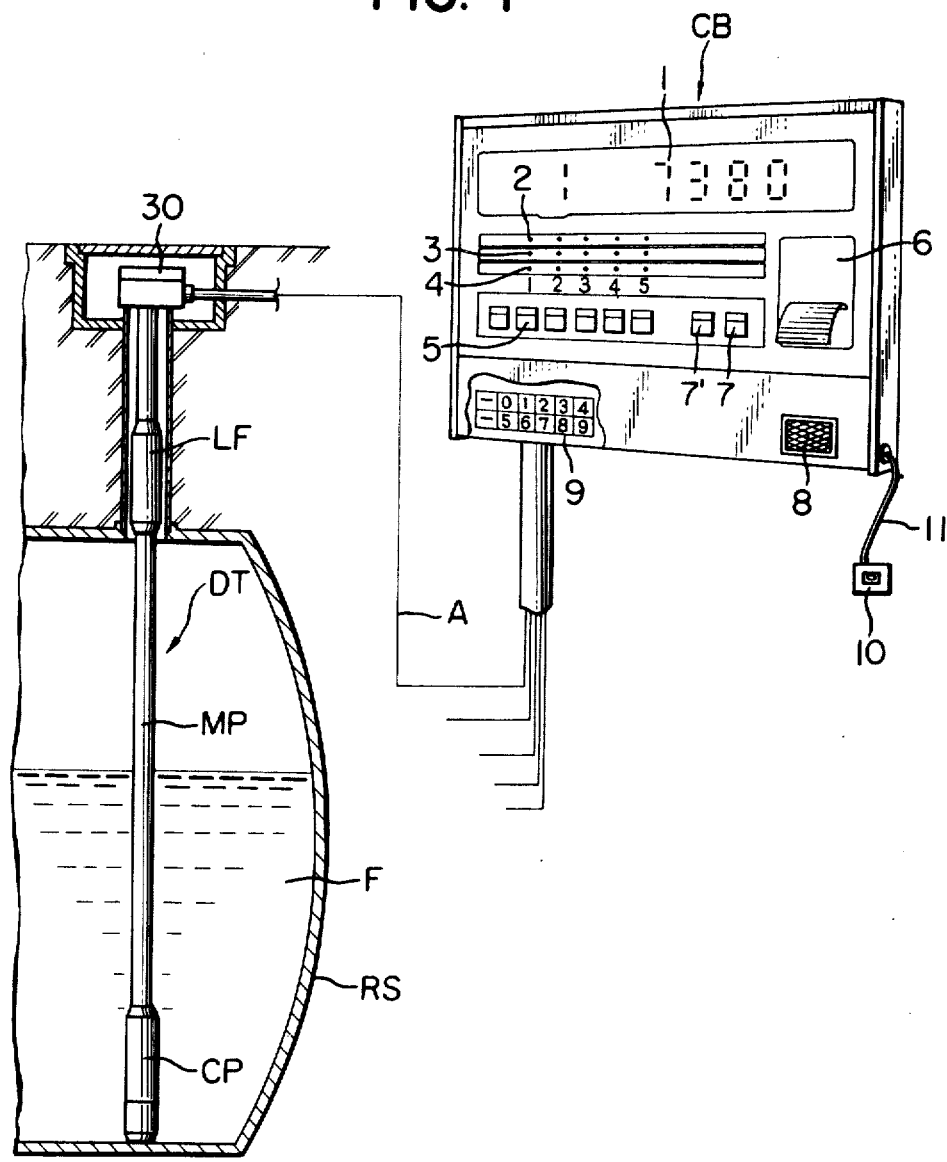

In FIG. 1, there is merely shown in part only one underground tank RS accommodating a fuel F therein but a plurality of such tanks, for instance five tanks may be arranged. A detector DT belongs to each tank RS. Although an explanation of the detector DT will be given later in detail, with reference to FIGS. 2 and 3, it comprises a fuel dielectric constant measuring means CP arranged vertically on bottom of the tank RS and dipped always and fully in the fuel, a fuel level detecting means MP mounted on the fuel dielectric constant measuring means CP to measure a capacity which varies depending on the fuel level, and a level feeder LF incorporating a reference means and converting information on capacitances measured by said fuel dielectric constant measuring means, fuel level detecting means and reference means into frequency information as its outputs. The output of the level feeder LF exclusively belonging to each tank RS is fed through each line A to a control box CB to be installed in an office cabin (not shown). On the control box CB, there are arranged a numeral indicator 1 common to a plurality of the tanks to indicate a number identifying the specified tank, the quantity of the fuel in the specified tank and also the others, a plurality of first lamps 2, each of which is adapted to be lit when the quantity of liquid in the concerned tank reaches its upper limit, a plurality of second lamps 3, each being lit when the quantity of liquid in the concerned tank reaches its lower limit, a plurality of third lamps 4, each being lit when a predetermined amount of water accumulates in the concerned tank, a plurality of button switches 5, each of which is operated to select a specified tank, a printer 6, another button switch 7 to operate the printer, a buzzer 8 which is operated when one of said first, second and third lamps 2,3,4 is lit to convert the visible information into an audible information, and a ten-key keyboard 9 arranged at inner side of lower cover of the control box CB, which is operated for making input of various data. An alarm 10 arranged in a suitable place is connected through a line 11 to the control box CB which also has a button switch 7' to be pressed for electrically connecting the alarm to the control box CB.

Figure 2:
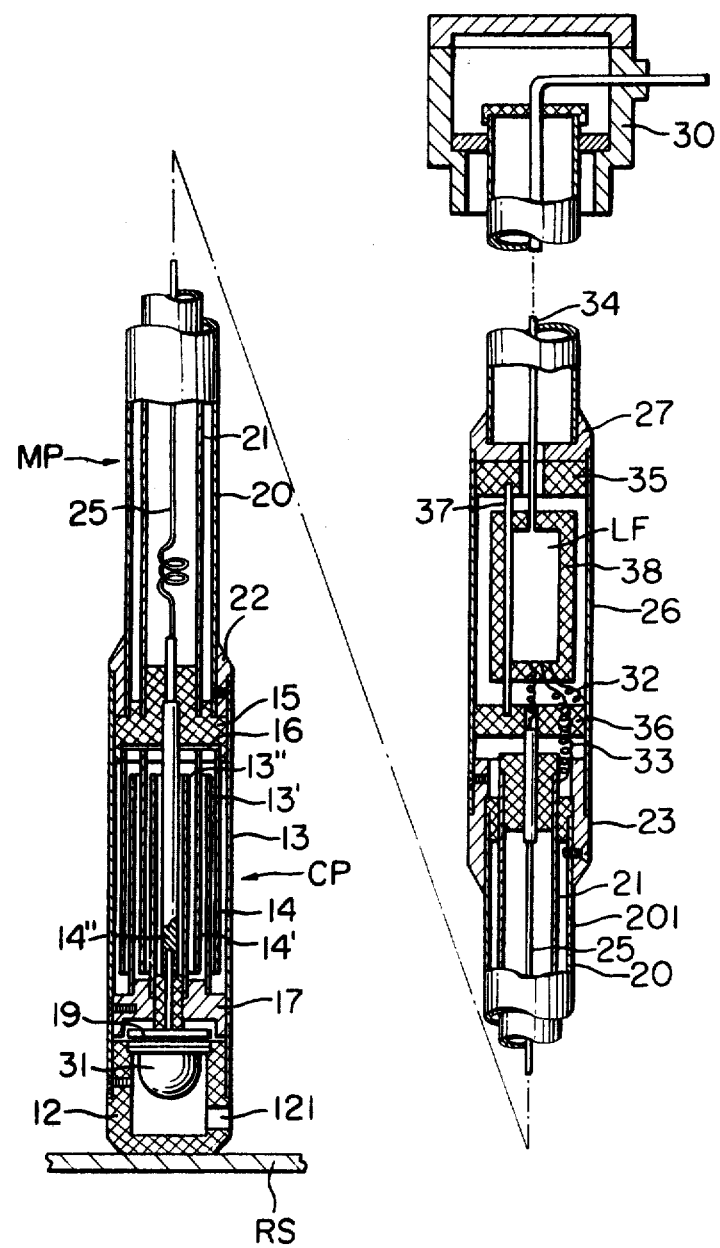
FIG. 2 is a fragmental and longitudinal section of the detecting part to show its structure in detail.

The structure of detector DT will now be explained in detail with reference to FIG. 2. The detector DT has at its lower end a sleeve 12 made of an electrical insulation material, which is mounted on bottom of the tank RS and has at least one opening 121 to allow the flow-in of fuel F in the tank and water entered in the tank by any reason and/or separated from the fuel. On the sleeve 12, there is arranged a fuel dielectric constant measuring means CP comprising a plurality of metallic pipes 13, 13', 13", 14, 14', 14" arranged in a concentric manner, wherein on one hand, each of said pipes 14, 14' and 14" constitutes a positive electrode, supported by an insulation supporting member 15 and integrally connected to a conductive member 16 and on the other hand, each of said pipes 13, 13' and 13" constitutes a negative electrode and supported by a conductive supporting member 17. Spaces formed between the concentrically arranged pipes constituting the fuel dielectric constant measuring means CP communicate with an inner space of said sleeve through an opening (not shown) formed in the conductive supporting member 17 and are always filled with the fuel F. It is preferable that the fuel dielectric constant measuring means CP incorporates means 19 which, together with the conductive supporting member 17 constitute a water detecting means 19, since although the fuel dielectric constant measuring means CP per se can detect the presence of water due to a rapid change in its capacitive output based on the fact that the capacitances of the fuel and water are quite different, if no separate water detecting means is provided, a disassembly thereof will be required to remove water droplets on surfaces of the multi-pipe structure. This is difficult in a mere suction water removing operation. On the fuel dielectric constant measuring means CP, there is arranged a fuel level detecting means MP comprising a metallic outer pipe 20 as negative electrode and a metallic inner pipe 21 as positive electrode to allow the fuel F flowing therebetween through openings (not shown) formed in the supporting member 15 and conductive member 16. The negative outer pipe 20 is conductively connected through a conductive supporting member 22 to the negative electrode 13 of the fuel dielectric constant measuring means CP at lower end thereof, and supported by a conductive supporting member 23 at upper end thereof, while the positive inner pipe 21 is supported by the supporting member 15 at its lower end and by an insulation supporting member 24 at its upper end. The inner pipe 21 has in its inner space a lead 25 connected to the positive electrode of said fuel dielectric constant measuring means CP to feed the information on capacitance measured by the fuel dielectric constant measuring means CP inclusive of the water detecting means 17,19. The outer pipe 20 has an opening 201 near its upper end to make easy the flow-in of fuel between the inner and outer pipes 20,21. On the fuel level detecting means CP, there are sequently arranged a level feeder LF accommodated in a metallic pipe 26. A joint pipe 29 mounted through a conductive supporting member 27 on the metallic pipe 26 and a headbox 30 to vertically maintain the joint pipe 29 and make convenient the maintenance of each of the fuel dielectric constant measuring means CP inclusive of the water detecting means 17,19, the fuel level detecting means MP and the level feeder LF. There are provided screws or other fixing means to conductively connect the sleeve 12 with the outermost pipe or electrode 13 of the fuel dielectric constant measuring means CP, the outermost pipe 13 to the outer pipe 20 of the fuel level detecting means MP, the outer pipe 20 to the pipe 26 accommodating therein the level feeder LF, and the pipe 26 to the joint pipe 29 through respectively the supporting members 17, 15, 23 and 27 and thus the detector DT can easily be disassembled by releasing the fixing means, when one of the elements should be exchanged. It is preferable to arrange a wire-net member 31 at upper end of the sleeve 12 to prevent the entry of any foreign material which may be dispersed in the liquid in the tank RS, from entering to the fuel dielectric constant measuring means CP and the fuel level detecting means MP. The reason why the fuel dielectric constant measuring means CP is constructed as the concentrically arranged multi-pipe lies is that the total surface area of the cylindrical electrodes 13, 13', 13" or 14, 14', 14" are made large without so increasing its height or length to make the capacity measured by such electrodes similar to that measured by the fuel level detecting means MP, so that any capacitive change depending on the kind and temperature of the fuel can accurately be measured. The level feeder LF is conductively connected to the negative pipe 26 through a line 32, converts capacitive information from the fuel dielectric constant measuring means CP inclusive of the water detecting means 17,19 and the fuel level detecting means MP through respectively lines 25 and 33 into corresponding frequency signals, incorporates a reference means, also converts capacitive information measured by the reference means into a corresponding frequency signal, and feeds as outputs those frequency signals to the control box CB (FIG. 1) through a line 34. As explained later with reference to FIG. 3, the level feeder LF has various elements which are supported by a rod 37 which is in turn supported by insulation supporting members 35,36, arranged in the pipe 26 and embedded in a body 38 of an insulating synthetic resin for instance epoxy resin. The joint pipe 29 serves to connect the headbox 30 to be installed at the ground surface level to the pipe 26 of the level feeder LF to be installed near the fuel level detecting means MP which should be arranged in the underground tank RS, at an installation depth which may be different in various conditions in each case. Therefore, the length of joint pipe 29 is initially set as having a relatively long size and, if necessary the joint pipe 29 is cut by taking the depth where the tank is embedded under the ground, when the detector DT (see FIG. 1) is installed at the tank in question.

Figure 3:
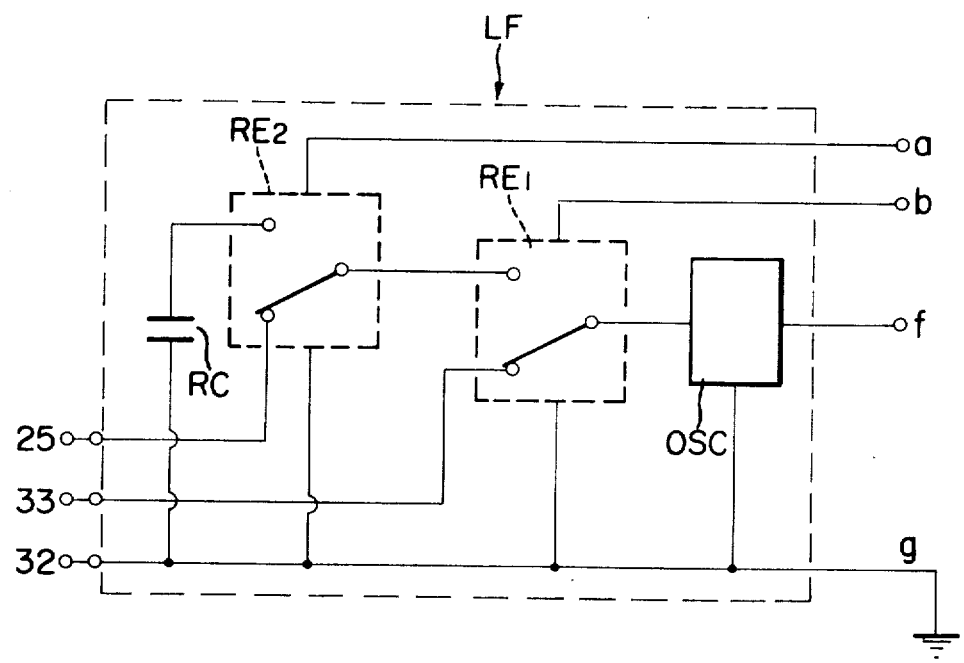
FIG. 3 is a block diagram showing a level feeder to be arranged in the detecting part.

As seen from FIG. 3, the level feeder comprises relays (contacting relays) $RE_1, RE_2$, an LC oscillation circuit OSC, and a reference means (reference capacitor) RC. The reference capacitor constituting the reference means RC is a high quality capacitor which shows almost no capacitive variation due to ambient temperature change and aging and is selected to have a capacity similar to those as measured by the fuel dielectric constant measuring means MP and the fuel level detecting means MP (FIG. 2). The LC oscillation circuit OSC comprises a plurality of coils and capacitors and serves to oscillate in response to the capacitive information to be fed from the fuel level detecting means MP, the fuel dielectric constant measuring means CP and reference means so as to convert the same into corresponding frequency signals. In the output lines of the level feeder LF, lines a and b are relay lines, f is a feeding line of the frequency signals, and g is a grounding line.

Figure 4:
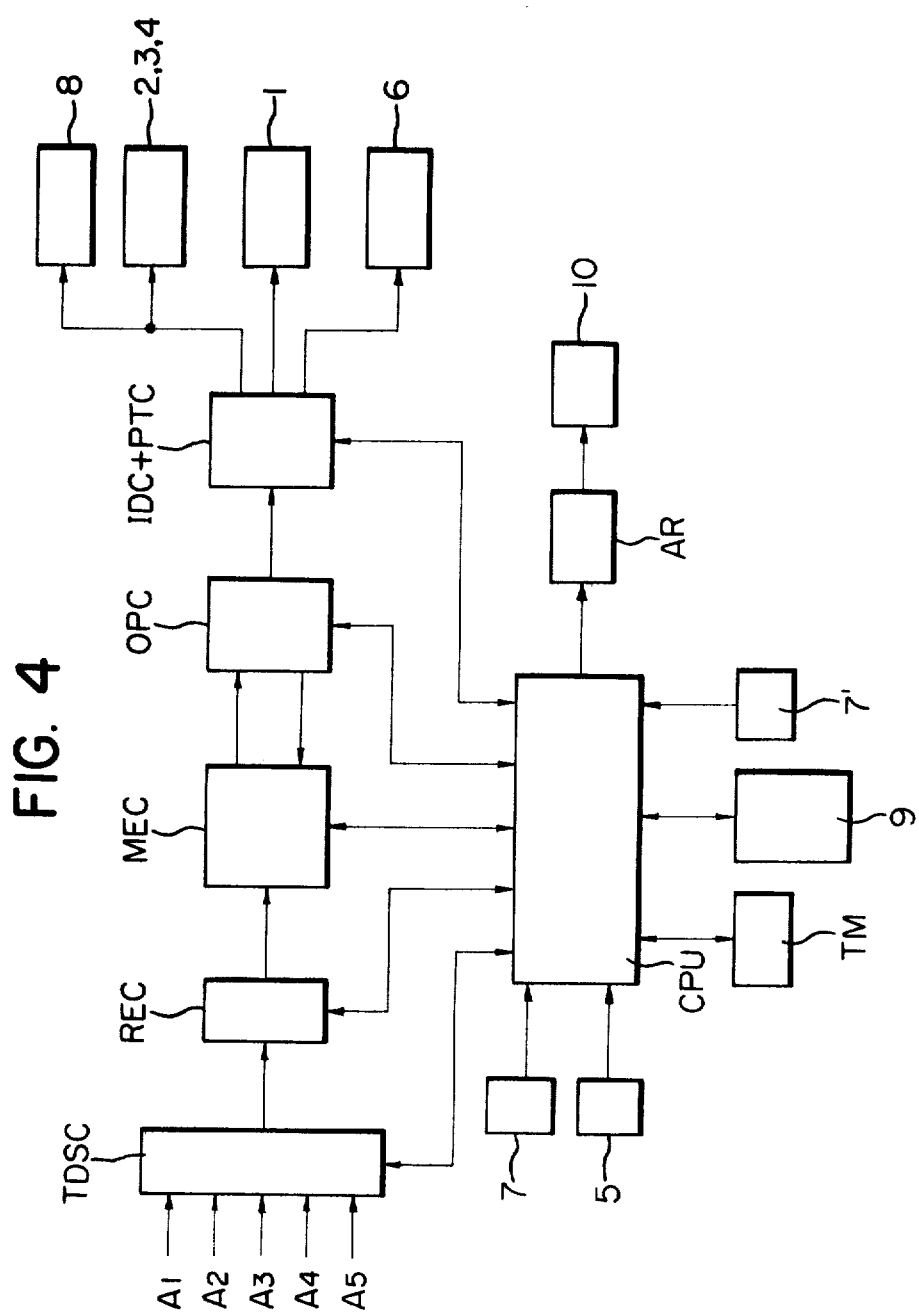
FIG. 4 is a block wiring showing a control circuit and circuits belonging thereto, which are employed for the apparatus.

FIG. 4 is a block wiring to show the functions of the control box CB illustrated in FIG. 1, in connection with an arrangement wherein a plurality of the tanks (5 tanks) are arranged. In this Figure, the means designated by reference symbol TDSC is a tank designation switching circuit, each of lines $A_1$ to $A_5$ is a signal line connected to the feeding line f (see FIG. 3) of the level feeder LF belonging to a specified one of the tanks, said switching circuit being subsequently switched by a signal from a control circuit of central processing unit CPU. A signal from the switching circuit TDSC is fed to a memory circuit MEC through a receiving circuit REC. The memory circuit MEC has memories with equations for calculating the fuel level based on the frequency signal from the level feeder LF and a quantity of liquid in the tank based on the calculated fuel level, upper and lower limit quantities for each tank and other matters as well as has an area for retaining in memory the quantity of the liquid in each tank. An operation or arithmetic circuit OPC serves to calculate the liquid quantity based on a signal from the receiving circuit REC and the equations stored by the memory circuit MEC and also to determine whether or not the calculated quantity reaches the upper or lower limit quantity on the specified tank. An output signal of the operation circuit OPC is then fed to an indication-printer circuit (IDC+PTC) electrically connected to the buzzer 8, lamps 2,3,4, indicator 1 and printer 6 (FIG. 1). The tank selection button 5, the printer operating button 7, a timer TM, the ten-key keyboard 9, the alarm button 7', an alarm circuit AR and each of said circuits are electrically connected to the control circuit CPU. The alarm circuit AR is connected to the alarm 10 which may be arranged at a place remote from the control box CB (FIG. 1).

The operation of the apparatus will now be explained.

When the switching circuit TDSC is electrically connected to the line $A_1$ of the signal line from the level feeder LF of the first or No. 1 tank by a signal from the control circuit CPU, a signal from the control circuit CPU is fed to the relays $RE_1$ and $RE_2$ to cause switching thereof from the state as illustrated in FIG. 3 and complete a circuit connecting the reference means (reference capacitor) RC to the LC oscillator OSC, so that a frequency signal corresponding to the capacity measured by the reference capacitor RC is fed to the memory circuit MEC through the receiving circuit REC. The signal to the relay $RE_2$ is then removed to complete a circuit connecting the signal line 25 from the fuel dielectric constant measuring means CP to the LC oscillator OSC, so that a frequency signal in response to the capacity measured by the fuel dielectric constant measuring means CP is fed to the memory circuit MEC through the receiving circuit REC. Finally the signal to the relay $RE_1$ is removed to complete a circuit connecting the signal line 33 from the fuel level detecting means MP to the LC oscillator OSC, so that a frequency signal in response to the capacity measured by the fuel level detecting means MP is fed to the memory circuit MEC through the receiving circuit REC. These frequency signal data stored by the memory circuit are converted by the operation circuit OPC into liquid quantity information signals based on the liquid quantity calculating equation stored by the memory circuit MEC and the resulting liquid quantity information is compared with the upper and lower limit quantity informations also stored by the memory circuit MEC, whereby if the calculated quantity is higher than the upper limit one, the lamp 2 is lit and an audible sound is issued by the buzzer 8 and if the calculated quantity is lower than the lower limit one, the lamp 3 is lit and an audible sound is issued by the buzzer 8.

A time period required to measure the liquid quantity for each tank is about 1 second. Upon completion of the measurement, a signal is automatically issued from the control circuit CPU to switch the switching circuit TDSC to connect the same to the signal line $A_2$ of the second tank and to commence a measurement on this tank in a manner similar to the first tank. This measuring operation is repeated to the last tank of No. 5 tank and then to the first tank. In other words, measurement for the tanks is continuously carried out in a linking manner.

Therefore, if one of the tank designation buttons 5 is then pushed down, a liquid quantity in the designated tank is indicated on the indicator 1 together with its tank number and if the button is reset, the indicator 1 indicates the time based on signals from the timer TM. In other words, the indicator 1 serves as the digital watch, when it is not employed for indicating the liquid quantity in one of the tanks.

If the printing button 7 is pressed down under a state that the tank designation button 5 has been pressed down, the liquid quantity in the designated tank and the time are printed out by the printer 6.

Further, if an alarm button 7' had been pressed down when the liquid dispensing service operation was finished such as the time for closing the fuel dispensing station, the liquid quantity in each tank at that time has been stored in memory by the memory circuit MEC and thus if there is a quantity change in any tank over a predetermined amount on a certain ground of flow-in of water, robbery or the like, an alarm signal is issued from the alarm circuit AR to operate the alarm 10 which may be installed at a suitable place such as in a guard company to take a suitable counter-measure. The alarm signal may also operate the printer 6 through the control circuit CPU and printer circuit PTC to print out the changed quantity of the liquid and the time.

Further, if water is accumulated in the tank RS to reach the level of the part 19 of the water detecting means 17,19, the frequency information signal shows an abnormal value when the fuel dielectric constant measuring means CP is connected to the LC oscillator OSC, since the dielectric constant of water is very high as about 81.6 in comparison with values of about 2.1 and 1.0 of oils and air, respectively to cause a rapid increase in the capacity. The detection of such abnormal information will visually and audibly be signalled by lighting up of the lamp 4 and sounding of the buzzer 8. The removal of water may be carried out by a conventional manner, but according to the invention, the water content in the tank can be estimated by the presence of the water detecting means 17,19 to make easy the removal operation.

As described hereinbefore, the liquid quantity measuring apparatus of the invention attains an accurate measurement by compensating with the liquid dielectric constant measuring means a variation of the dielectric constant of the liquid to be measured, and with the reference means a variation of the response of the LC oscillator. Further it is possible to install the indication part at a position apart from that for the detection part, in order to centrally monitor the data on plural tanks, since the measured capacitance which is one analog information is converted near the detection part into the frequency information which is one of digital information and does not cause any change in the data informations due to outer disturbances.

We claim:

1. An apparatus for measuring the quantity of liquid in at least one tank, which comprises means for detecting a liquid level in the tank and having positive and negative electrodes arranged to allow a flow-in and out of the liquid therebetween for generating a capacitive value, capacitive means arranged below said liquid level detecting means and dipped always in the liquid to measure a dielectric constant of the liquid, a capacitive reference means that is not responsive to the dielectric constant of the liquid, a LC oscillator means converting each capacitive value measured by said liquid level detecting means, liquid dielectric constant measuring means and reference means into a frequency signal, said reference means compensating a capacitive variation of said LC oscillator means due to ambient temperature change and aging thereof, said LC oscillator means being connected to each of said liquid level detecting means, liquid dielectric constant measuring means and reference means through a switching means, and a control box with an indicator means to calculate the quantity of liquid in the tank based on the frequency information from said LC oscillator means and indicate the same on the indicator means.

2. An apparatus as claimed in claim 1 further comprising means for detecting a second liquid and arranged near the bottom of the tank.

3. An apparatus as claimed in claim 1, wherein said liquid dielectric constant measuring means comprises a plurality of hollow cylindrical members arranged in concentric manner to form the positive and negative electrodes, respectively.

4. An apparatus as claimed in claim 1, said reference means comprising a high quality capacitor.

5. An apparatus as claimed in claim 1 further comprising a pair of relay means which constitute, together with said reference means and LC oscillator means, a level feeding means arranged near said liquid level detecting means.

6. An apparatus as claimed in claim 5, wherein each of said level feeding means, liquid level detecting means and liquid dielectric constant measuring means is constructed respectively as a unit having a cylindrical outer configuration, which units are combined to form a detector.

7. An apparatus as claimed in claim 1, wherein said control box accommodates a counter circuit to count the frequency of the frequency signal to be fed from said LC oscillator means, a control circuit connected to the counter circuit to calculate the level of liquid in the tank and the quantity thereof based on the frequency counted by the counter circuit, and an indicator-printer circuit to display and print out a result processed by the control circuit.

8. An apparatus as claimed in claim 2, wherein said water detecting means is formed as a part of said liquid dielectric constant measuring means.

9. An apparatus as claimed in claim 5, wherein all of elements constituting said level feeding means are mounted on a common base plate arranged in a cylindrical member and embedded in an insulation material body which is cured in the cylindrical member.

10. An apparatus as claimed in claim 7, wherein said control circuit is connected respectively to a memory circuit, a circuit for inputting information to the memory circuit for storing same, an operational circuit for comparing input information to be fed to said control circuit with the data stored in the memory circuit, a tank designation switching circuit to specify one of said tanks, and a timer.

11. An apparatus as claimed in claim 10, wherein said memory circuit stores a predetermined upper and lower limit quantity of liquid in each tank, based on corresponding information to be previously given through said input circuit, whereby an alarm signal is issued from the operational circuit when a quantity of liquid in the tank specified by the tank designation switching circuit reaches the upper or lower limit quantity.

12. An apparatus as claimed in claim 10, wherein time information from said timer is fed through said control circuit to a printer or indication part of said indicator-printer circuit, when said tank designation switching circuit is OFF.

13. An apparatus as claimed in claim 10, wherein said control circuit is further connected to an alarm circuit which is in turn connected to a remote alarm member to issue alarm information, and wherein said memory circuit stores special information for actuating a printer through said control circuit and indicator-printer circuit and actuating the remote alarm member through the alarm circuit when the quantity of the liquid in any tank varies more than a predetermined amount outside of determined hours.

* * * * *